R. SMITH.

Cask and Barrel Truck.

No. 73,398.

2 Sheets—Sheet 1.

Patented Jan. 14, 1868.

WITNESSES:
Theo. Tusche
J. A. Service

INVENTOR:
Robt Smith
Per Munn & Co.
Attorneys

R. SMITH.
Cask and Barrel Truck.

No. 73,398.

2 Sheets—Sheet 2.

Patented Jan. 14, 1868.

WITNESSES:
Theo. Tuscke
J. A. Service

INVENTOR:
Robt Smith
Per Munn & Co.
Attorneys

United States Patent Office.

ROBERT SMITH, OF BROOKLYN, NEW YORK.

Letters Patent No. 73,398, dated January 14, 1868.

---

IMPROVEMENT IN DEVICE FOR RAISING CASKS AND BARRELS.

---

*The Schedule referred to in these Letters Patent and making part of the same.*

---

TO ALL WHOM IT MAY CONCERN:

Be it known that I, ROBERT SMITH, of Brooklyn, in the county of Kings, and State of New York, have invented a new and improved Device for Raising Casks, Barrels, &c.; and I do hereby declare that the following is a full, clear, and exact description thereof, which will enable others skilled in the art to make and use the same, reference being had to the accompanying drawings, forming part of this specification, in which—

Figure 1:
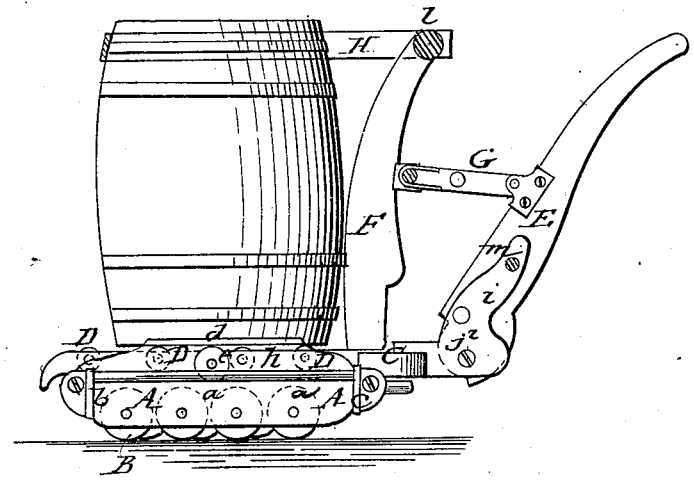
Figure 2:
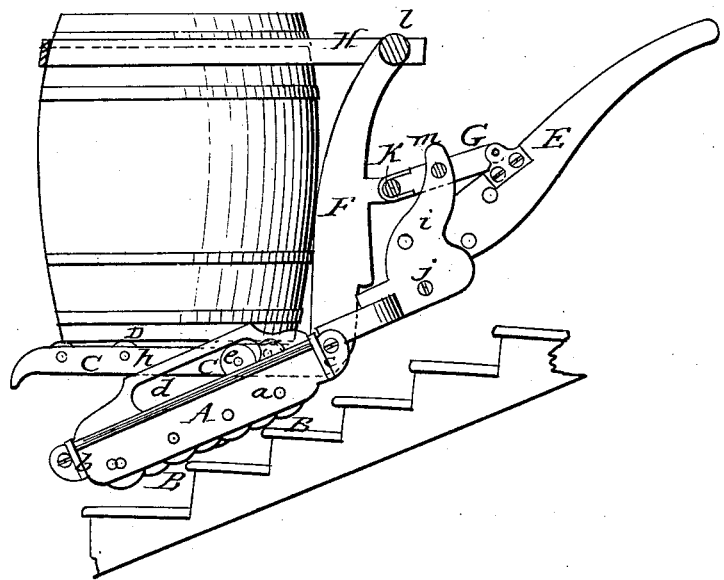
Figure 3:
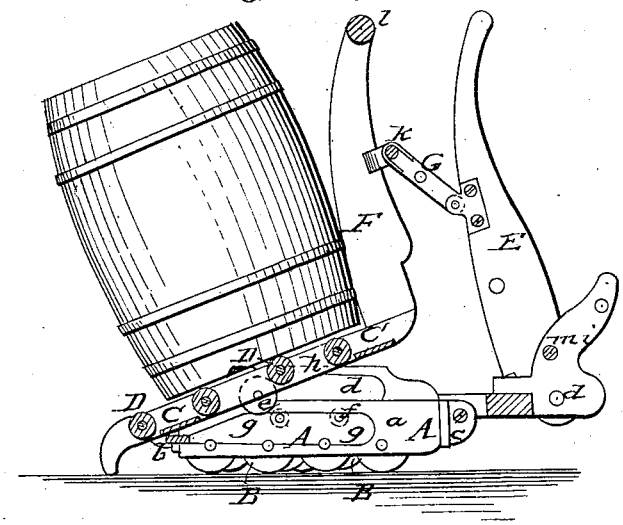

Figures 1, 2, and 3 are side views, partly in section, of my invention, showing it in different positions.

Figure 4:
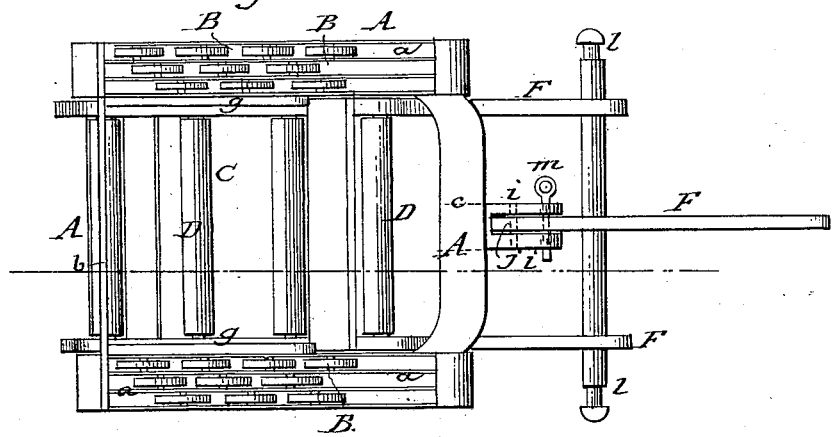

Figure 4 is an inverted plan view of the same.

Similar letters of reference indicate like parts.

This invention relates to a device by which casks, barrels, and other similar articles, can be easily transported up or down stairs or steps, and also on level ground.

The invention consists chiefly in the use of a frame, which is provided with a series of wheels on its under side. These wheels are arranged in rows, in such a manner that, when the frame is drawn up steps, one wheel will always be on the edge of each step, and the device can thus be drawn up stairs with ease. Upon this frame is supported another frame, which is provided with horizontal rollers. The barrel or cask to be elevated is placed upon this frame, and is secured to the same. The latter frame can be inclined forward or backward upon the wheeled frame, or can be set level, as may be desired. By means of a handle which is pivoted to the wheeled frame, and one which is secured to the upper frame, the device can be easily operated.

A represents a horizontal frame, consisting of two side pieces, $a\ a$, a front piece, $b$, and a rear piece, $c$, as shown in fig. 4. In the side pieces are arranged the bearings of a number of wheels, B B, of which three rows are in each side piece; and in each row the wheels are arranged close to each other, as is clearly shown in the drawings, and particularly in fig. 4. The axles of the wheels in one row are not in line with those in the other rows, (see fig. 4,) and thereby a continual rolling-surface is provided, whereby the device can be easily drawn up steps, as is indicated in fig. 2.

Above each side piece $a$ is arranged a board, $d$, which has a slot, as shown. Through the slots in the pieces $d$ pass the friction-rollers $e$, which are secured to the sides of a frame, C, the latter thus resting upon the rollers $e$, and upon friction-rollers $f$, which are secured to blocks, $g$, that are fixed to the insides of the side pieces $a$ of the frame A, and upon which the side pieces $h$ of the frame C rest. These blocks $g$ have partly a level and partly an inclined surface, as shown in fig. 3.

Between the side pieces of the frame C are arranged horizontal rollers, D D, which have their bearings in the said side pieces, and which extend entirely across the frame C, as shown.

From the rear piece $c$ of the frame A project upward two curved ears, $i\ i$, between which a vertical lever, E, is pivoted by a pin, $j$.

F F are two vertical arms, which project upwards from the rear ends of the side pieces of the frame C, and which are connected by a cross-bar, $k$, near their centres, and by a cross-bar, $l$, at their top ends, the ends of latter extending beyond the bars F, as shown in fig. 4. The lever E is connected with the cross-bar $k$ by a rod, G, which is pivoted at both ends, as shown.

A cask or barrel to be transported is loaded upon the device, and stands upon the rollers D, as shown in fig. 1. When to be transported over level ground, the frame C is held level by passing a pin, $m$, through a hole in the upper part of the ears $i\ i$, and through the lever E, as shown in fig. 1. When ascending and descending stairs and steps, the pin $m$ is taken out, and the lever E bent back and downwards, and the pin $m$ passed through the hole in the upper part of the ears $i$, and through the rod G, as shown. The frame C is thus held level, while the frame A is inclined, as is clearly shown in fig. 2.

The barrel is secured to the frame C by means of a strap, H, of which the ends are secured to the ends of the cross-bar $l$. When the barrel is to be removed from the frame C, the pin $m$ is taken out, and the lever E raised and thrown forward. The frame C will then stand inclined on the inclined surface of the blocks $g$, while the frame A is level, as is clearly shown in fig. 3. In this position the device can be held by passing the pin $m$ through holes in the lower portion of the ears $i$ and lever E. By unfastening one end of the strap H, the barrel will be released, and will gradually side down, on the rollers D, to the floor.

The lever E and cross-bar $l$ serve as the handles of the apparatus, by which the same can be drawn or pushed in any direction, as may be desired.

What I claim as new, and desire to secure by Letters Patent, is—

1. A device for transporting barrels, casks, &c., which is made and operating substantially as herein shown and described.

2. The wheels B, when arranged in rows, the axles in one row not being in line with those in the other rows on the same side of the frame A, substantially as and for the purpose herein shown and described.

3. The frame A, when provided with slotted upper bars, $d$, and blocks, $g$, in combination with the frame C and rollers $e$ and $f$, all made and operating substantially as and for the purpose herein shown and described.

4. The device for changing the respective positions of the frames A and C, consisting of the lever E, connecting-rod G, cross-bar $k$, ears $i$, and pin $m$, all made, operating, and secured substantially in the manner herein shown and described.

5. The rollers D D on the frame C, in combination with the frame A and rollers B, as set forth.

ROBERT SMITH.

Witnesses:
    WM. F. MCNAMARA,
    ALEX. F. ROBERTS.